United States Patent Office 3,441,498
Patented Apr. 29, 1969

3,441,498
HYDROGENATION METHOD AND APPARATUS
John C. Jubin, Jr., Wallingford, and Stephen F. Zabielski, Reading, Pa., assignors to Atlantic Richfield Company, Philadelphia, Pa., a corporation of Pennsylvania
Filed Mar. 15, 1967, Ser. No. 623,317
Int. Cl. C10g 23/04
U.S. Cl. 208—143          11 Claims

ABSTRACT OF THE DISCLOSURE

An improved method and apparatus for the hydrogenation of hydrocarbons wherein said hydrogenation is conducted in the liquid-phase in an up-flow reactor utilizing an improved fluid distribution means and an eductor for the circulation of a hydrogen recycle stream wherein the reaction is carried out at a temperature of from about 200° F. to about 850° F., and at a pressure of from about atmospheric to about 5000 p.s.i.g.

BACKGROUND OF INVENTION

This invention relates to an improved method for the treatment of hydrocarbon oils with a hydrogen containing gas stream. More particularly, the invention concerns a continuous liquid phase catalytic process for effecting hydrogenation of hydrocarbon oils such as, for example, virgin naphtha, cracked naphtha, solvents, jet fuel, kerosine, diesel fuel, heating oil, lubricating oils, and waxes.

The invention also relates to an improved apparatus for the treatment of hydrocarbon oils with a hydrogen containing gas.

The treatment of liquid hydrocarbon oils such as for example, gas oil, petroleum oil, wax, and other high boiling liquids with a hydrogen containing gas in the presence of a hydrogenation catalyst, in order to improve such properties as odor, color, sulfur and nitrogen content, and olefin saturation, etc., without substantial conversion of the oil is well-known in the prior art. Various methods for accomplishing the hydrogenation have been utilized, namely, fluidized bed systems and down-flow reactor systems. In the use of a down-flow reactor system, however, various difficulties are encountered. For example, poor gas-liquid contacting results in view of the difficulty in distributing the liquid. In addition, various systems have been employed utilizing costly compressors, once through hydrogen flow systems and up-flow reactors. However, these systems have required extremely high hydrogen containing gas flow rates and have proved to be uneconomical.

SUMMARY OF INVENTION

In accordance with the method and apparatus of our invention, the difficulties encountered in the prior art are avoided and it is now not only possible to obtain an efficient, substantially continuous hydrogenation of various hydrocarbon oils, but it is possible to obtain the desired result for a much wider range of materials and in a more economical manner. More particularly, in the method and apparatus of our invention there is eliminated the need for a costly compressor, and further, through the use of an up-flow reactor in combination with an improved fluid distribution means and an eductor, hydrogenation of a hydrocarbon oil charge stream can be more easily effected. In addition, the percent olefin content in the product can be decreased at decreased operating temperatures. As such, the size of the reactor, in order to achieve a particular result, i.e., degree of hydrogenation, can be reduced with a concomitant decrease in the amount of catalyst required. A substantial savings in capital cost and operating expense thus results.

In the method of our invention the use of a recycle gas stream tends to keep the quantity of light hydrocarbons introduced with the hydrogen containing gas stream to a minimum. The use of a recycle gas also serves to presaturate the feed prior to its entering the bottom of the reactor. Additionally, through use of the recycle stream sufficient hydrogen can be circulated in the up-flow reactor at a very low cost while at the same time maintaining adequate gas-liquid contacting.

Wide ranges of temperature and pressure conditions can be employed in conducting the hydrogenation reaction, with the particular conditions being selected dependent upon the degree of hydrogenation desired. General ranges of temperature and pressure conditions which can be utilized are from about 200° F. to about 850° F. and from about atmospheric to 5000 p.s.i.g. respectively.

The amount of hydrogenation effected increases with increasing temperature and pressure. Under relatively mild reaction conditions color bodies in the charge hydrocarbon stream are reacted upon to achieve an improvement in color and color stability without substantially altering the physical properties of the oil. Under more severe hydrogenating conditions substantial desulfurization of the hydrocarbon oil feed stream can be effected by conversion of contained sulfur compounds to hydrogen sulfide. Further, substantial alterations of the physical properties of the oil can be achieved through hydrogenation of aromatic or other unsaturated compounds present in the charge material.

Numerous catalysts can be utilized for carrying out the reaction, for example, a porous base such as alumina, silica alumina, or charcoal impregnated with an active hydrogenation component such as palladium, nickel platinum, cobalt and molybdenum, and particularly, the salts, oxides and sulfides of the aforementioned metals. While any of the enumerated classes of hydrogenation catalysts can be used, some catalysts are better than others. In the method and apparatus of our invention we have found that a cobalt molybdate catalyst is particularly suitable.

It is therefore an object of our invention to provide an improved method for the hydrogenation of a hydrocarbon oil.

Another object of our invention is to provide an improved method for the hydrogenation of a hydrocarbon oil wherein substantial increases in economy are realized.

Yet another object of our invention is to provide an apparatus to accomplish the objects hereinabove enumerated.

Other objects, advantages and features of our invention will be apparent to those skilled in the art without departing from the spirit and scope of our invention, and it should be understood that the latter is not necessarily limited to the accompanying discussion and drawing.

In a broad aspect, our invention is directed to a process which comprises passing a hydrocarbon stream at a reaction temperature and at a pressure sufficient to maintain liquid phase conditions to the high pressure inlet of an eduction zone having a high pressure inlet, a low pressure inlet and an outlet; passing a hydrogen containing gas obtained as hereinafter set forth to said low pressure inlet of said eduction zone to obtain a combined stream of hydrocarbon and hydrogen containing gas, passing said combined stream from the outlet of said eduction zone to the lower end portion of a reaction zone having an upper end portion and lower end portion; passing additional hydrogen containing gas to the lower end portion of said reaction zone, said additional hydrogen containing gas being supplied above the level of introduction of said combined stream; removing liquid hydrogenated product from the upper end portion of said reaction zone; and removing a hydrogen containing gas from said upper end portion of said reaction zone, said gas being the gas supplied to the low pressure inlet of said eduction zone as above set forth.

In another broad aspect, our invention is directed to an apparatus comprising a reaction vessel having an upper end portion, a lower end portion and a fixed bed of catalyst therein; liquid level control means communicating with said vessel and adapted to maintain a liquid level in said upper end portion and above the catalyst bed therein; a first feed conduit communicating with the lower end portion of said vessel at a level below said bed of catalyst; fluid distribution means in the lower end portion of said vessel and above said first conduit; a second feed conduit communicating with the lower end portion of said vessel at a level below said fluid distribution means and below said first conduit; an eductor having a high pressure inlet, a low pressure inlet and an outlet, a hydrocarbon feed conduit communicating with said high pressure inlet; a first removal conduit extending from the upper end portion of said vessel at a level above said catalyst bed but below that maintained by said liquid level control means; a second removal conduit extending from said vessel at a level above that maintained by said liquid level control means, said second removal conduit extending to the low pressure inlet of said eductor; and a conduit extending from the outlet of said eductor to said second feed conduit.

In a more limited aspect, our invention is directed to an apparatus as hereinabove set forth having an improved fluid distribution means comprising a horizontal flat plate extending across the cross sectional area of said reaction vessel, said flat plate having positioned thereon a plurality of gas nozzle means having walls defining an orifice and a plurality of liquid inlet standpipe means having an upper end portion and lower end portion, said liquid inlet standpipe means extending in a vertical direction downwardly from said flat plate.

DESCRIPTION OF DRAWINGS

In order to more fully understand the method and apparatus of our invention, reference is made to the accompanying drawings wherein:

FIGURE 4 is a chart showing the relationship of percent olefin saturation as a function of temperature in both up-flow and down-flow reaction systems.

Referring now to FIGURE 1, the apparatus therein illustrated comprises a vertical chamber or reaction vessel 1 having a lower end portion 2 and an upper end portion 3. Positioned between the lower end portion 2 and the upper end portion 3 there is located a catalytic reaction zone 6 containing a fixed bed of catalyst 4. The catalyst is supported within the vessel by means of the fluid distribution means 5. There is located above and below the catalyst bed 4, graded alumina balls 8 and 7. A first feed conduit 9 communicates with the lower end portion 2 of the vessel 2 below the bed of catalyst 4, but above the lower end portion 58 of the liquid inlet standpipes 50 supported by the fluid distribution means 5. A second feed conduit 11 communicates with the lower end portion 2 of the vessel 1 below the liquid inlets 50 of the fluid distribution means 5 and below conduit 9. There is further located on the vessel 1 a first removal conduit 12. The conduit 12 is positioned below the upper end portion 3 and above the catalyst bed 4. A liquid level controller 13 located in the upper end portion of the vessel 1 communicates through control line 14 to control valve 15 on conduit 12 which is positioned below the liquid level 17. A second removal conduit 18 is positioned in the upper end portion 3 of vessel 1 above the liquid level 17. Conduit 18 communicates with the low pressure inlet 16 of eductor 19. A hydrocarbon feed stream conduit 20 communicates with a pump 21 having a discharge conduit 22. Discharge conduit 22 communicates with a heat exchanger 23 which thence communicates through conduit 24 to the high pressure inlet 10 of eductor 19. The outlet 35 of eductor 19 communicates with feed line 11 through conduit 32. Conduits 33 and 34 are respectively the inlet and outlet conduits for heating or cooling fluid directed to the heat exchanger 23. There is preferably located in conduits 18 and 24 flow controllers 25 and 26 and flow control valves 27 and 28 respectively. The flow controllers 25 and 26 communicate with the flow control valves 27 and 28 through control lines 36 and 37 respectively. A pressure controller 29 is preferably located in the upper end portion 3 of vessel 1. The pressure controller 29 communicates through control line 30 with a pressure control valve 31 positioned within conduit 9.

Referring now to FIGURES 2 and 3, there is shown a plan and elevational view respectively of the fluid distribution means 5 which comprises a substantially flat plate 54 extending horizontally across the cross section of vessel 1. There are located on the flat plate 54 a plurality of gas nozzles 51 each nozzle having walls defining an orifice 52 and a plurality of liquid inlet standpipes 50, said standpipes extending in a vertical direction downwardly from the flat plate 54. There is positioned in the upper end portion 53 of each liquid inlet standpipe 50 a plug 55 having walls defining an orifice 56.

PREFERRED EMBODIMENT

Figure 1:
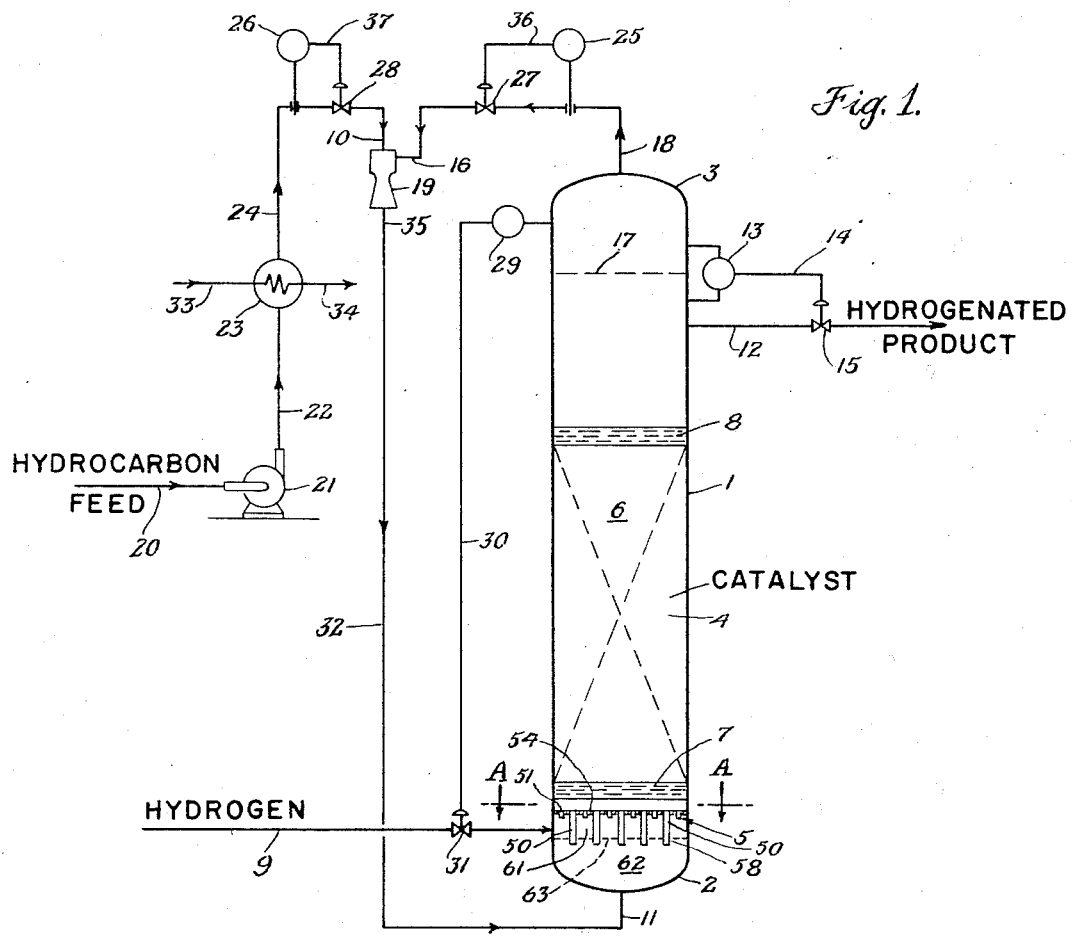
FIGURE 1 is a diagrammatic illustration of the arrangement of the apparatus for conducting the process according to our invention.
Figure 2:
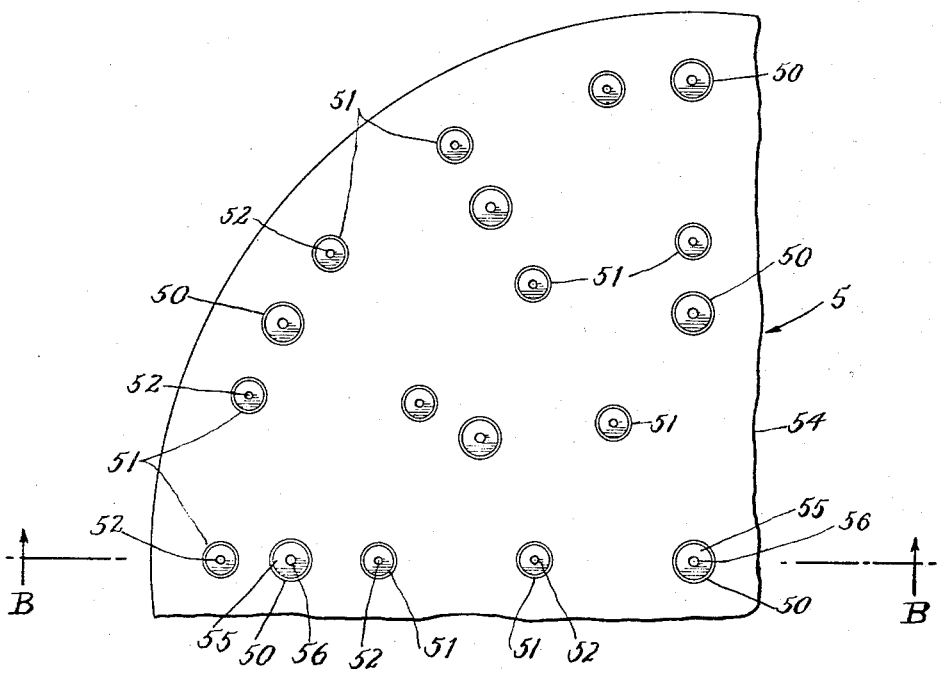
FIGURE 2 is a quarter sectional view of the symmetrical fluid distribution means taken along a plane A—A of FIGURE 1.
Figure 3:
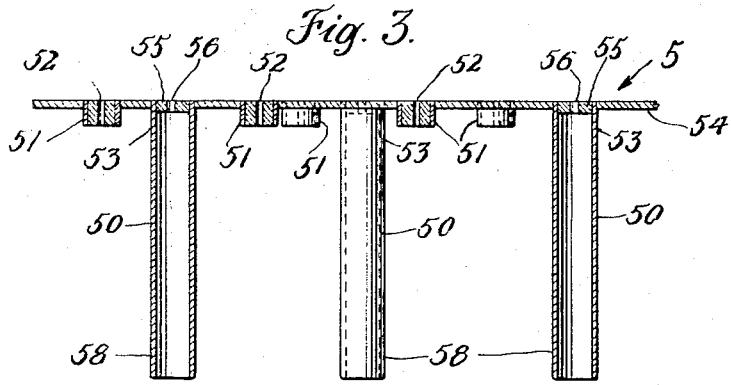
FIGURE 3 is a sectional view taken along a plane B—B of FIGURE 2.

In the method of our invention, a hydrocarbon feed stream is directed through conduit 20 to the inlet of pump 21. The discharge stream from pump 21 flows through the discharge conduit 22 to a heat exchanger 23 wherein the hydrocarbon stream can be heated or cooled as desired dependent upon the temperature of the feed stream in conduit 20. The temperature of the hydrocarbon stream emerging from the heat exchanger 23 is preferably maintained at a temperature of about 600° F. such that liquid phase conditions are maintained, although a temperature in the range of from about 200° to 850° F. is suitable. The pressure is not critical, however, it is preferred to operate at a pressure of 400 p.s.i.g. although a pressure in the range of from about atmospheric to about 5000 p.s.i.g. is suitable. It will be understood, by those skilled in the art that the temperature and pressure can be increased or decreased within the ranges indicated dependent upon the composition of the hydrocarbon feed stream and the severity of hydrogenation desired. The temperature and pressure must, however, be such that the hydrocarbon feed stream remains in the liquid phase. The stream emerging from heat exchanger 23 flows through conduit 24 to the high pressure inlet 10 of eductor 19. A recycle stream comprising a hydrogen containing gas flows from the upper end portion 3 of vessel 1 through a removal conduit 18 to the low pressure inlet 16 of eductor 19 and it is combined with and compressed by the hydrocarbon feed stream. The hydrocarbon and hydrogen containing gas stream emerges as a combined stream from the eductor outlet 35 and flows through conduit 32 and conduit 11 to the lower end portion 2 of the vessel 1.

A hydrogen containing gas stream is introduced to the lower end portion 2 of vessel 1 through conduit 9. The rate of hydrogen flow is at a rate such that the desired pressure is maintained in vessel 1. A suitable pressure controller 29 and pressure control valve 31 can be utilized to control the flow of the hydrogen containing gas.

The liquid level 17 of the hydrocarbon in the vessel 1 is maintained near the top of or above the fixed catalyst bed 4 in order to achieve liquid phase or flooded bed conditions. For this purpose a suitable liquid level controller 13 in combination with control valve 15 can be utilized. The level control means thus regulates the flow of hydrocarbon product from vessel 1 through conduit 12. The hydrocarbon product can be directed to subsequent treatment facilities if desired.

Suitable flow controllers 25 and 26 and flow control valves 27 and 28 can be utilized to automatically control the flow of the recycle stream and the hydrocarbon feed stream respectively to the eductor 19.

The hydrogen containing gas stream and hydrocarbon feed stream prior to contacting the catalyst passes through the lower end portion 2 of vessel 1 and thence passes through the novel fluid distribution means 5 which extends across the entire cross sectional area of vessel 1. A liquid phase is maintained at a liquid level 63 in a calming section 62 in the lower end portion 2 of vessel 1. As such, each of the inlets of the liquid inlet standpipes 50 is submerged in the liquid maintained in the calming section 62. The hydrogen containing gas and the hydrocarbon feed stream entering the vessel 1 through conduit 11 is separated into two phases, the liquid phase passes through the calming section 62 and thence through the liquid inlet standpipes 50 to the catalyst bed 4. The liquid in the calming section 62 comprises a major amount of hydrocarbon and a minor amount of hydrogen. The hydrogen present in the stream passing through conduit 11 (i.e., undissolved hydrogen) accumulates in the vapor space 61 above the liquid maintained in the calming section 62 below the flat plate 54, where it is contacted with a fresh hydrogen containing gas stream entering the vessel 1 through conduit 9. The gas thence flows from vapor space 61 through gas nozzles 51 to the catalyst bed 4. The novel fluid distribution means 5 thus provides an efficient and economical means whereby intimate contacting of the gas, liquid and catalyst results.

In a preferred embodiment of our invention each gas nozzle 51 comprises a sintered porous plug having walls defining an orifice 52. The gas nozzles 51 are concentrically positioned in the flat plate 54 and are equally spaced. The use of thirty-six gas nozzles is suitable in a six foot diameter vessel, however, it will be apparent to those skilled in the art as the vessel diameter is increased or decreased the number of gas nozzles can also be increased or decreased.

The liquid inlet standpipes 50 are likewise concentrically positioned in the flat plate 54 and are equally spaced; a liquid inlet standpipe is also positioned in the center of the flat plate 54. The use of 19 standpipes is suitable. It is preferred that plugs 55 having walls defining an orifice 56 be positioned in the upper end portion of each liquid inlet standpipe. However, it will be apparent that the plugs can be eliminated if so desired. It will be further obvious to those skilled in the art that the number of gas nozzles 51 and liquid inlet standpipes 50 can be increased or decreased in number, and further, that the location and orientation of the nozzles and standpipes can be varied, dependent upon the size of the vessel 1 and the gas and liquid flow rates desired.

The following specific example is presented to show the method of operation of our invention.

EXAMPLE I

An oil feed comprising 90 percent $C_{20}$ to $C_{16}$ paraffinic hydrocarbons and 10 percent olefins is heated to 600° F. and directed through the eductor at 7500 bbl./day whch causes the desired volume of recycle gas comprising 72 mole percent hydrogen and 28 mole percent hydrocarbons to flow at 150,000 s.c.f./day. The liquid-gas stream emerging from the eductor is then fed to the reactor vessel. Hydrogen rich make-up gas comprising 85.5 mole percent hydrogen and 14.5 mole percent hydrocarbons (mainly methane) is added to the reactor vessel at the rate of 600,000 s.c.f./day such that the pressure in the reactor is maintained at 400 p.s.i.g. The catlyst utilized is a cobalt molybdate catalyst. The reactor is 6 feet in diameter and contains a catalyst bed 20 feet in height. Hydrocarbon oil product is removed from the reactor at a rate of 7520 bbl./day (includes dissolved hydrogen and hydrocarbons from impure hydrogen feed). In this example 96.5 percent of the olefin in the feed is converted to a saturated paraffin.

The actual flow of hydrogen is in this case 108,000 s.c.f./day in the recycle stream and 512,000 s.c.f./day in the make-up stream. 364,000 s.c.f./day of hydrogen is consumed in the reaction and 148,000 s.c.f./day of hydrogen is dissolved in the liquid product.

It can be seen from the within example that approximately 50 s.c.f. of hydrogen/bbl. is consumed in the reaction and further, that approximately 20 s.c.f. of hydrogen/bbl. is dissolved in the liquid product.

The nature and extent of the economy of operation may be seen from the accompanying FIGURE 4. This figure discloses percent olefin saturation as a function of temperature for both an up-flow and a down-flow reactor. It can be seen from this figure that the percent olefin saturation at various temperatures is significantly greater when an up-flow reactor is used as opposed to a down-flow reactor. This figure is based upon the treatment of a $C_{20}$ to $C_{26}$ paraffin stream containing 10 percent olefins. The catalyst was a supported cobalt molybdate catalyst having the following composition,

| | Percent |
|---|---|
| $MoO_3$ | 12.5 |
| $CoO$ | 3.5 |
| $Na_2O$ | .05 |
| Iron | .03 |
| $SiO_2$ | .1 |

Balance, alumina base.

and generally referred to as Nalcomo 471. The space velocity was maintained at 3 lbs./hr. per lb. of catalyst; pressure was maintained at 300 p.s.i.g. The hydrogen flow was varied from 70 to 300 s.c.f./bbl. of hydrocarbon feed with approximately 50 s.c.f./bbl. being consumed in the reaction. It will be understood, of course, by those skilled in the art that a generally similar relationship will exist for other hydrocarbon feed streams and for other temperature ranges.

In the operation of our invention, the hydrocarbon stream can be heated or cooled as desired dependent upon the initial temperature of the hydrocarbon feed stream. When a fresh catalyst charge is used, lower reatcion temperatures can be utilized, and as the catalyst ages, the temperature can be increased. The catalyst can be regenerated if desired, such as, for example, by burning with an air-inert gas mixture, steam-air mixture, treating with solvent, stripping, or the like.

From the foregoing description, it will be apparent that the present invention results in a method and apparatus for conducting a hydrogenation reaction in a manner which has not heretofore been employed. It will be understood that various modifications and alterations of the invention will become apparent and can be made by those skilled in the art without departing from the spirit and scope thereof, and that the specific details hereinabove set forth are purely illustrative.

Having thus described our invention, it should be understood that no undue limitations or restrictions are to be imposed by reason thereof.

We claim:

1. A process which comprises passing a hydrocarbon stream at a reaction temperature and at a pressure sufficient to maintain liquid phase conditions to the high pressure inlet of an eduction zone having a high pressure inlet a low pressure inlet and an outlet; passing a hydrogen containing gas obtained as hereinafter set forth to said low pressure inlet of said eduction zone to obtain a combined stream of hydrocarbon and hydrogen containing gas, passing said combined stream from the outlet of said eduction zone to the lower end portion of a rection zone having an upper end portion and lower end portion; passing additional hydrogen containing gas to the lower end portion of said reaction zone, said additional hydrogen containing gas being supplied above the level of introduction of said combined stream; removing liquid hydrogenated product from the upper end portion of said reaction zone; and removing a hydrogen containing gas from said upper end portion of said reatcion zone, said gas being the gas supplied to the low pressure inlet of said eduction zone as above set forth.

2. The process according to claim 1 wherein said reaction temperature of the hydrocarbon stream is within the range from about 200° F. to about 800° F. and the pressure is within the range of from about atmospheric to 5000 p.s.i.g.

3. The process according to claim 1 wherein the temperature of the hydrocarbon stream is 600° F.

4. The process according to claim 3 wherein the pressure of the hydrocarbon stream is 400 p.s.i.g.

5. A process which comprises passing a hydrocarbon stream at a reaction temperature and at a pressure sufficient to maintain liquid phase conditions to the high pressure inlet of a eduction zone having a high pressure inlet, a low pressure inlet and an outlet; passing a hydrogen containing gas obtained as hereinafter set forth to said low pressure inlet of said eduction zone to obtain a combined stream of hydrocarbon and hydrogen containing gas; passing said combined stream from the outlet of said eduction zone to a liquid calming zone maintained in the lower end portion of a reaction zone having an upper end portion and lower end portion; passing additional hydrogen containing gas to a vapor zone maintained in the lower end portion of said reaction zone; removing liquid hydrogenated product from the upper end portion of said reaction zone, and removing a hydrogen containing gas from said upper end portion of said reaction zone, said gas being the gas supplied to the low pressure inlet of said eduction zone as above set forth.

6. The apparatus comprising a reaction vessel having an upper end portion, a lower end portion and a fixed bed of catalyst therein; liquid level control means communicating with said vessel and adapted to maintain a liquid level in said upper end portion and above the catalyst bed therein; a first feed conduit communicating with the lower end portion of said vessel at a level below said bed of catalyst; fluid distribution means in the lower end portion of said vessel above said first conduit; a second feed conduit communicating with the lower end portion of said vessel at a level below said fluid distribution means and below said first conduit; an eductor having a high pressure inlet, a low pressure inlet and an outlet, a hydrocarbon feed conduit communicating with said high pressure inlet, a first removal conduit extending from the upper end portion of said vessel at a level above said catalyst bed but below that maintained by said liquid level control means; a second removal conduit extending from said vessel at a level above that maintained by said liquid level control means, said second removal conduit extending to the low pressure inlet of said eductor; and a conduit extending from the outlet of said eductor to said second feed conduit.

7. The apparatus according to claim 5 wherein said fluid distribution means comprises a horizontal flat plate extending across the cross sectional area of said reaction vessel said flat plate having positioned thereon a plurality of gas nozzle means having walls defining an orifice and a plurality of liquid inlet standpipe means having an upper end portion and lower end portion, said liquid inlet standpipe means extending in a vertical direction downwardly from said flat plate.

8. The apparatus according to claim 7 wherein there is positioned in the upper end portion of the liquid inlet standpipe means plugs having walls defining an orifice.

9. The apparatus according to claim 7 wherein said first feed conduit communicates with the lower end portion of said vessel at a level above said lower end portion of said liquid inlet standpipe means and below said flat plate.

10. The process according to claim 1 wherein said reaction zone comprises a fixed bed catalytic reaction zone.

11. The process according to claim 10 wherein said combined stream is passed from the outlet of said eduction zone to a liquid calming zone maintained in the lower end portion of said reaction zone.

References Cited

UNITED STATES PATENTS

| 3,117,072 | 1/1964 | Eastman et al. | 208—143 |
| 3,188,286 | 6/1965 | Van Driesen | 208—108 |
| 3,296,120 | 1/1967 | Doelp et al. | 208—143 |
| 3,338,820 | 8/1967 | Wolk et al. | 208—143 |

HERBERT LEVINE, *Primary Examiner.*

U.S. Cl. X.R.

23—288, 289; 208—264